US012683708B2

(12) United States Patent
An et al.

(10) Patent No.: US 12,683,708 B2
(45) Date of Patent: Jul. 14, 2026

(54) WAVEFORM CONTROL METHOD, RADIO DEVICE, AND INTEGRATED CIRCUIT

(71) Applicant: CALTERAH SEMICONDUCTOR TECHNOLOGY (SHANGHAI) CO., LTD., Shanghai (CN)

(72) Inventors: Fazhi An, Shanghai (CN); Yafei Shi, Shanghai (CN); Tao Gong, Shanghai (CN)

(73) Assignee: Calterah Semiconductor Technology (Shanghai) Co., Ltd., Shanghai (CN)

( * ) Notice: Subject to any disclaimer, the term of this patent is extended or adjusted under 35 U.S.C. 154(b) by 485 days.

(21) Appl. No.: 18/168,564

(22) Filed: Feb. 13, 2023

(65) Prior Publication Data

US 2023/0198657 A1    Jun. 22, 2023

Related U.S. Application Data

(63) Continuation of application No. PCT/CN2022/111563, filed on Aug. 10, 2022.

(30) Foreign Application Priority Data

Sep. 30, 2021    (CN) .......................... 202111165913.5

(51) Int. Cl.
*H04W 72/20* (2023.01)
*H04L 1/00* (2006.01)
*H04L 27/10* (2006.01)
(52) U.S. Cl.
CPC ............ *H04L 1/0006* (2013.01); *H04L 27/10* (2013.01)

(58) Field of Classification Search
CPC .............. H04B 1/04; H04B 2001/0491; H04B 7/2656; H04L 1/0006; H04L 27/10
See application file for complete search history.

(56) References Cited

U.S. PATENT DOCUMENTS 5,050,161 A * 9/1991 Golestani ............ H04L 12/5602
370/396
12,114,297 B2 * 10/2024 Liu ........................ H04L 5/1469
(Continued)

FOREIGN PATENT DOCUMENTS

CN        101447826 A        6/2009
CN        105900527 A        8/2016
(Continued)

OTHER PUBLICATIONS

Calterah Semiconductor Technology (shanghai) Co., Ltd., The Second Office Action with English translation, CN 2021111659135, Apr. 29, 2024, 9 pgs.
(Continued)

*Primary Examiner* — Phuc H Tran
(74) *Attorney, Agent, or Firm* — USCH Law, PC

(57) ABSTRACT
Embodiments of the present disclosure provide a waveform control method, a radio device, a radio signal, a signal transmission link and an integrated circuit. The waveform control method includes: calling, by a chip structure, at least two types of frame-configuration parameters from an external storage and storing the frame-configuration parameters in a memory; acquiring a frame order, and calling corresponding frame-configuration parameters from the memory in sequence according to the frame order; and generating frame period signals according to the corresponding frame-configuration parameters. The frame period signals include at least two frames of signals.

15 Claims, 3 Drawing Sheets

(56)                References Cited

U.S. PATENT DOCUMENTS

| 2009/0144596 | A1* | 6/2009 | Mohan | H04N 19/895 |
| | | | | 714/E11.023 |
| 2009/0296854 | A1* | 12/2009 | Yamano | H04B 15/00 |
| | | | | 375/295 |
| 2010/0054329 | A1* | 3/2010 | Bronstein | H04N 19/154 |
| | | | | 375/240.03 |
| 2015/0043467 | A1 | 2/2015 | Kondo et al. | |
| 2015/0071153 | A1* | 3/2015 | Hong | H04L 5/0023 |
| | | | | 370/312 |
| 2016/0204887 | A1* | 7/2016 | Lee | H04N 21/2362 |
| | | | | 375/295 |
| 2016/0327633 | A1* | 11/2016 | Kumar Y.B. | G01S 7/35 |
| 2017/0315659 | A1 | 11/2017 | Kuroiwa et al. | |
| 2018/0123754 | A1 | 5/2018 | Kim et al. | |
| 2018/0301816 | A1 | 10/2018 | Kamo et al. | |
| 2020/0025870 | A1 | 1/2020 | Melzer et al. | |
| 2020/0322977 | A1 | 10/2020 | Yasukawa et al. | |

FOREIGN PATENT DOCUMENTS

| CN | 107710011 | A | 2/2018 |
| CN | 107766764 | A | 3/2018 |
| CN | 109085543 | A | 12/2018 |
| CN | 111600680 | A | 8/2020 |
| CN | 111693996 | A | 9/2020 |
| CN | 111983597 | A | 11/2020 |
| CN | 112437206 | A | 3/2021 |
| CN | 112764036 | A | 5/2021 |
| CN | 113325374 | A | 8/2021 |
| EP | 3860264 | A1 | 8/2021 |
| WO | 2021031077 | A1 | 2/2021 |

OTHER PUBLICATIONS

Guanyuan Chen, et al., "Design of variable-frequency AWG", Science Technology and Engineering, vol. 17 No. 3, Jan. 28, 2017, 4 pgs.

Zhenghui Chen, et al., "Design for MIMO Radar and Implementation of OFDM-LFM Waveform", Radar Science and Technology, vol. 11 No. 1, Feb. 15, 2013, 5 pgs.

Zhiyi Duan, et al., "A novel FMCW waveform for multi-target detection and the corresponding algorithm", 2017 IEEE 5th International Symposium on Electromagnetic Compatibility (EMC-Beijing), Jan. 18, 2018, 4 pgs.

Calterah Semiconductor Technology (shanghai) Co., Ltd., International Search Report with English translation, PCT/CN2022/111563, Nov. 2, 2022, 6 pgs.

Calterah Semiconductor Technology (Shanghai) Co., Ltd., European Search Report, EP22806881.3, Jan. 14, 2025, 7 pgs.

Calterah Semiconductor Technology (Shanghai) Co., Ltd., European Communication pursuant to Article 94(3) EPC, EP22806881.3, Sep. 29, 2025, 8 pgs.

* cited by examiner

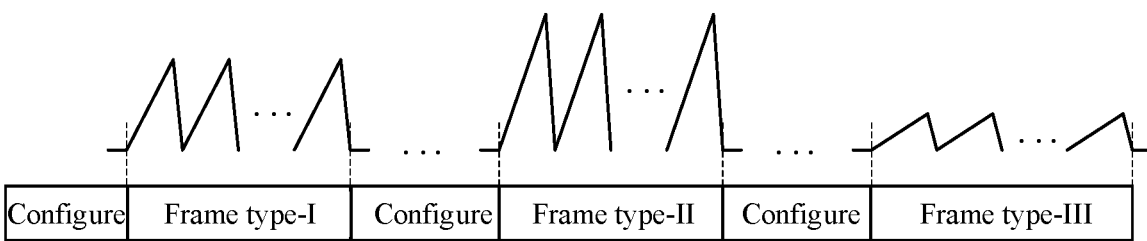

| Configure | Frame type-I | Configure | Frame type-II | Configure | Frame type-III |

FIG. 1

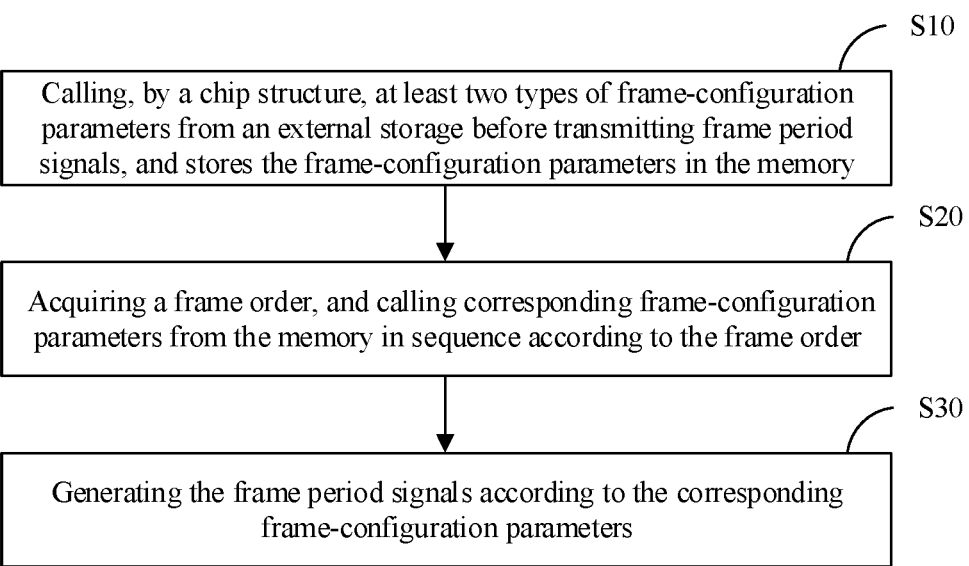

S10

Calling, by a chip structure, at least two types of frame-configuration parameters from an external storage before transmitting frame period signals, and stores the frame-configuration parameters in the memory

S20

Acquiring a frame order, and calling corresponding frame-configuration parameters from the memory in sequence according to the frame order

S30

Generating the frame period signals according to the corresponding frame-configuration parameters

FIG. 2

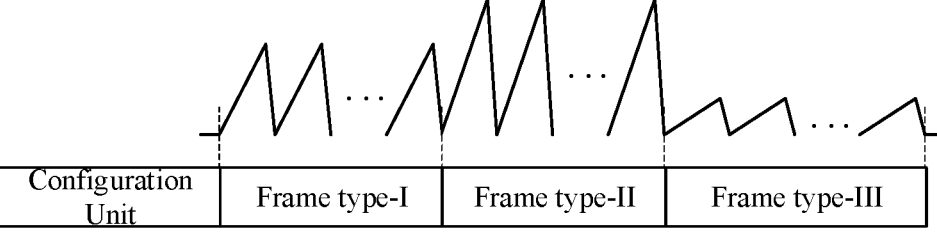

| Configuration Unit | Frame type-I | Frame type-II | Frame type-III |

FIG. 3

| Frame type-I | Frame type-I | Frame type-I | Frame type-I | ... | Frame type-I | Frame type-I |
|---|---|---|---|---|---|---|

FIG. 4A

← Frame period →

| Frame type-I | Frame type-II | Frame type-I | Frame type-II | ... | Frame type-I | Frame type-II |
|---|---|---|---|---|---|---|

FIG. 4B

| Random number | 1 | 4 | 3 | 1 | ... | 2 | 5 |
|---|---|---|---|---|---|---|---|
| | Frame type-I | Frame type-IV | Frame type-III | Frame type-I | ... | Frame type-II | Frame type-V |

FIG. 4C

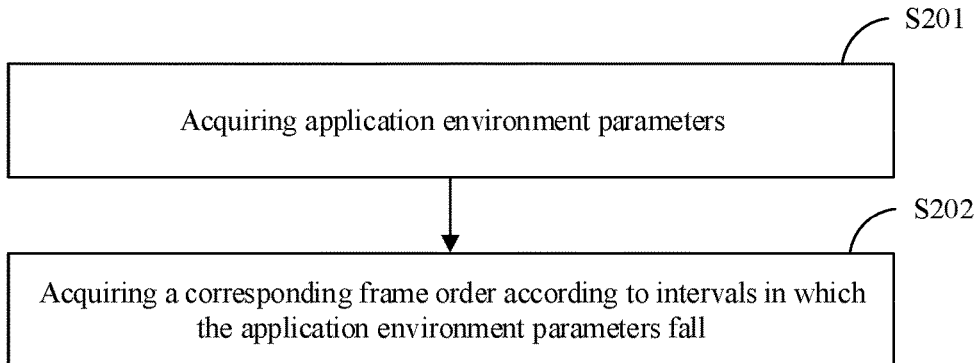

S201

Acquiring application environment parameters

S202

Acquiring a corresponding frame order according to intervals in which the application environment parameters fall

FIG. 5

WAVEFORM CONTROL METHOD, RADIO DEVICE, AND INTEGRATED CIRCUIT

CROSS REFERENCE TO RELATED APPLICATIONS

The present application is a continuation of PCT application No. PCT/CN2022/111563, entitled "WAVEFORM CONTROL METHOD, RADIO DEVICE, AND RADIO SIGNAL AND TRANSMITTING LINK THEREFOR," filed on Aug. 10, 2022, which claims priority to Chinese application No. 202111165913.5, filed on Sep. 30, 2021, each of which is incorporated by reference herein in its entirety.

TECHNICAL FIELD

Embodiments of the present disclosure relate to the field of radio technology, and in particular to a waveform control method, a radio device, a radio signal, a radio signal transmission link and an integrated circuit.

BACKGROUND

Currently, when a radio device is transmitting signals, waveform parameters generally have to be reconfigured at starting of each frame. That is, frame-configuration parameters have to be called from a memory external to a system on chip, (SoC) or a radio frequency chip at starting of each frame to configure the frame.

However, this cannot satisfy an application scenario demanding in highly timely response, because configuration of waveform parameters of each frame costs some time, which lowers operation efficiency of the radio device.

SUMMARY

Embodiments of the present disclosure provide a waveform control method, a radio device, a radio signal, a radio signal transmission link and an integrated circuit, which can reduce configuration time.

Some embodiments of the present disclosure provide a waveform control method for controlling a waveform of a signal transmitted by a radio device. The radio device includes a chip structure having a memory and further includes or has access to an external storage. The method includes: calling, by the chip structure, at least two types of frame-configuration parameters from the external storage and storing the at least two types of frame-configuration parameters in the memory; acquiring a frame order, and calling corresponding frame-configuration parameters from the memory in sequence according to the frame order; and generating frame period signals according to the corresponding frame-configuration parameters. The frame period signals include at least two frames of signals.

Some embodiments of the present disclosure provide a waveform control method for controlling a waveform of a signal transmitted by a radio device. The method includes: acquiring and storing, by the chip structure, at least two types of frame-configuration parameters; acquiring a frame order, and calling corresponding frame-configuration parameters in sequence according to the frame order; and generating frame period signals according to the corresponding frame-configuration parameters. The frame period signals include at least two frames of signals.

In some embodiments, acquiring and storing, by the chip structure, at least two types of frame-configuration parameters includes: calling, by the chip structure, at least two types of frame-configuration parameters from a first storage, and storing the at least two types of frame-configuration parameters to a second storage. As an example, the first storage is an internal storage of the chip structure or an external storage of the chip structure. The second storage is an internal storage of the chip structure. The internal storage of the chip structure may be a memory, a cache, a register, a register array or the like of the chip structure.

In the waveform control method as described above, before transmitting the frame period signals, the frame-configuration parameters are called in advance and stored in the memory, so that desired frame-configuration parameters can directly be called from the memory subsequently, without need of acquiring externally, thereby saving time for calling the frame-configuration parameters. By acquiring the frame order, a configuration order of a plurality of frame-configuration parameters within a preset duration can be acquired in one time, and the frame period signals can be generated according to the corresponding frame-configuration parameters, without need of performing configuration before generation of each of the frame period signals, thereby saving time required for generating the frame period signals based on the frame-configuration parameters. In other words, with one configuration, the radio device can call corresponding frame-configuration parameters in sequence according to the frame order. For a piece of radio signals within the preset duration, the frame-configuration parameters corresponding to a plurality of frames can be called through only one configuration. It is not necessary to reconfigure the radio signals at the beginning of each frame in a case where two adjacent frames are different, thereby reducing time desired for configuring the signals transmitted by the radio device and improving operation efficiency of the radio device. Moreover, the radio device can be kept in an operation state during the configuration, thereby preventing the problem that the radio device cannot continuously operate during configuration.

In some embodiments, the corresponding frame-configuration parameters include a first frame configuration parameter corresponding to a first frame of at least two adjacent frames in the frame period signals and a second frame configuration parameter corresponding to a second frame of the at least two adjacent frames, and the first frame configuration parameter and the second frame configuration parameter are different.

In some embodiments, the operation of calling the corresponding frame-configuration parameters from the memory in sequence according to the frame order includes:
   periodically and circularly calling the corresponding frame-configuration parameters from the memory in sequence according to the frame order.

In the waveform control method as described above, with one configuration, the corresponding frame-configuration parameters can be circularly called in a certain period and in sequence according to a preset frame-configuration parameter order in the frame order, thereby further reducing time desired for configuring the signals transmitted by the radio device and improving the operation efficiency of the radio device.

In some embodiments, the operation of acquiring the frame order includes:
   acquiring application environment parameters; and
   acquiring a corresponding frame order according to intervals in which the application environment parameters fall.

Some embodiments of the present disclosure provide a radio device including a chip structure and an external storage, at least two types of frame-configuration parameters are pre-stored in the external storage. The chip structure includes: a memory configured to store the at least two types of frame-configuration parameters called from the external storage before frame period signals are transmitted; a frame period control logic circuit configured to output a frame order; a frame configuration automatic acquisition logic circuit connected to the memory and the frame period control logic circuit and configured to call corresponding frame-configuration parameters from the memory in sequence according to the frame order; and a radio wave generation logic circuit connected to the frame configuration automatic acquisition logic circuit and configured to generate the frame period signals according to the corresponding frame-configuration parameters. The frame period signals include at least two frames of signals.

In the radio device provided as described above, the memory can store the frame-configuration parameters pre-called before transmitting the frame period signals, so that desired frame-configuration parameters can be directly called from the memory subsequently, without need of acquiring externally, thereby saving time for calling the frame-configuration parameters. The frame period control logic circuit can acquire and output in one time a configuration order of a plurality of frame-configuration parameters within a preset duration. In this way, the frame configuration automatic acquisition logic circuit can call corresponding frame-configuration parameters in sequence from the memory based on the order. Then the radio wave generation logic circuit can generate corresponding frame period signals based on the frame-configuration parameters, without need of performing configuration before generation of each of the frame period signals, thereby reducing time desired for generating the frame period signals based on the frame-configuration parameters. In other words, with one configuration, the radio device as described above can call corresponding frame-configuration parameters in sequence according to the frame order. For a piece of radio signals within the preset duration, the frame-configuration parameters corresponding to a plurality of frames can be called through only one configuration. It is not necessary to reconfigure the radio signals at the beginning of each frame in a case where two adjacent frames are different, thereby reducing time desired for configuring the signals to be transmitted and improving operation efficiency. Moreover, an operation state can be kept during the configuration, thereby preventing the problem that operation cannot be continuous during configuration.

In some embodiments, the corresponding frame-configuration parameters include a first frame configuration parameter corresponding to a first frame of at least two adjacent frames in the frame period signals and a second frame configuration parameter corresponding to a second frame of the at least two adjacent frames, and the first frame configuration parameter and the second frame configuration parameter are different.

In some embodiments, the frame configuration automatic acquisition logic circuit is further configured to periodically and circularly call the corresponding frame-configuration parameters from the memory in sequence according to the frame order.

In some embodiments, the frame period control logic circuit is further configured to acquire application environment parameters and to output corresponding frame order according to intervals in which the application environment parameters fall.

Some embodiments of the present disclosure provide a radio signal including at least one frame period. A frame period includes a configuration unit and at least two continuous frame units after the configuration unit. The configuration unit is configured to configure frame-configuration parameters for each of the at least two continuous frame units.

In the radio signal as described above, the configuration unit can configure the frame-configuration parameters for each frame unit within a preset duration in one time, without need of performing configuration before generation of each frame unit, thereby saving time for configuring the frame units.

In some embodiments, the corresponding frame-configuration parameters include a first frame configuration parameter corresponding to a first frame of at least two adjacent frame units and a second frame configuration parameter corresponding to a second frame of the at least two adjacent frames, and the first frame configuration parameter and the second frame configuration parameter are different. Each of the at least two continuous frame units includes a plurality of signal units; and waveforms of the plurality of signal units are identical in one frame unit.

In some embodiments, the radio signal includes a signal of frequency-modulated continuous wave.

Based on a similar inventive concept, some embodiments of the present disclosure further provide a signal transmission link including a feedback loop, a voltage-controlled oscillator, a transmission antenna connected in sequence, and a generator of frequency-modulated continuous wave. The generator of frequency-modulated continuous wave is connected to the voltage-controlled oscillator and the feedback loop respectively, and is configured to control, through the feedback loop, the voltage-controlled oscillator to transmit the radio signal according to any one of the preceding embodiments via the transmission antenna.

The signal transmission link as described above includes the generator of frequency-modulated continuous wave capable of transmitting the radio signals provided in any one of the preceding embodiments. The signal transmission link can achieve the technical effects that can be achieved by the radio signals, which are not described in detail here.

In some embodiments, the feedback loop, the voltage-controlled oscillator and the generator of frequency-modulated continuous wave are integrated in a same chip structure.

In some embodiments, the transmission antenna is integrated in the chip structure.

Some embodiments of the present disclosure provide an integrated circuit applied to a radio device including an external storage in which at least two types of frame-configuration parameters are pre-stored. The integrated circuit includes: a memory configured to store the at least two types of frame-configuration parameters called from the external storage; a frame period control logic circuit configured to output a frame order; a frame configuration automatic acquisition logic circuit connected to the memory and the frame period control logic circuit and configured to call corresponding frame-configuration parameters from the memory in sequence according to the frame order; and a radio wave generation logic circuit connected to the frame configuration automatic acquisition logic circuit, and configured to generate the frame period signals according to the corresponding frame-configuration parameters. The corresponding frame-configuration parameters include a first frame configuration parameter corresponding to a first frame of at least two adjacent frames in the frame period signals and a second frame configuration parameter corresponding to a second frame of the at least two adjacent frames, and the first frame configuration parameter and the second frame configuration parameter are different.

In the integrated circuit as described above, the memory can store the frame-configuration parameters pre-called before transmitting the frame period signals, so that the desired frame-configuration parameters can be directly called from the memory subsequently, without need of acquiring externally, thereby saving time for calling the frame-configuration parameters. The frame period control logic circuit can acquire and output in one time a configuration order of a plurality of frame-configuration parameters within a preset duration, so that the frame configuration automatic acquisition logic circuit can call corresponding frame-configuration parameters in sequence from the memory based on the order. Then the radio wave generation logic circuit can generate corresponding frame period signals based on the frame-configuration parameters, without need of performing configuration before generation of each of the frame period signals, thereby reducing time desired for generating the frame period signals based on the frame-configuration parameters. In other words, with one configuration, the integrated circuit as described above can call corresponding frame-configuration parameters in sequence according to the frame order. For a piece of radio signals within the preset duration, the frame-configuration parameters corresponding to the plurality of frames can be called through only one configuration. It is not necessary to reconfigure the radio signals at the beginning of each frame in a case where two adjacent frames are different, thereby reducing time desired for configuring the signals to be transmitted and improving operation efficiency. Moreover, an operation state can be kept during the configuration, thereby preventing the problem that operation cannot be continuous during configuration.

BRIEF DESCRIPTION OF THE DRAWINGS

In order to illustrate the technical solutions in a traditional technology or in the embodiments of the present disclosure more clearly, the drawings to be used in the description of the traditional technology or the embodiments will be briefly described below. It is obvious that the drawings in the following description are only some embodiments of the present disclosure. For those of ordinary skill in the art, other drawings may also be obtained in accordance with these drawings without any inventive effort.

FIG. 1 is a schematic diagram showing a configuration process of a radar.

FIG. 2 is a flowchart of a waveform control method in accordance with some embodiments of the present disclosure.

FIG. 3 is a schematic diagram showing a configuration process of a radio device in a waveform control method in accordance with some embodiments of the present disclosure.

FIG. 4A is a schematic diagram showing a configuration process in a case where a frame order is "frame type-I" and a period is 1; FIG. 4B is a schematic diagram showing a configuration process of a radio device in a case where a frame order is "frame type-I and a frame type-II" and a period is 2; FIG. 4C is a schematic diagram showing a configuration process of a radio device in a case where random numbers are acquired and a frame order is generated according to the random numbers;

FIG. 5 is a flowchart of an operation S20 in a waveform control method in accordance with some embodiments of the present disclosure.

Figure 6:
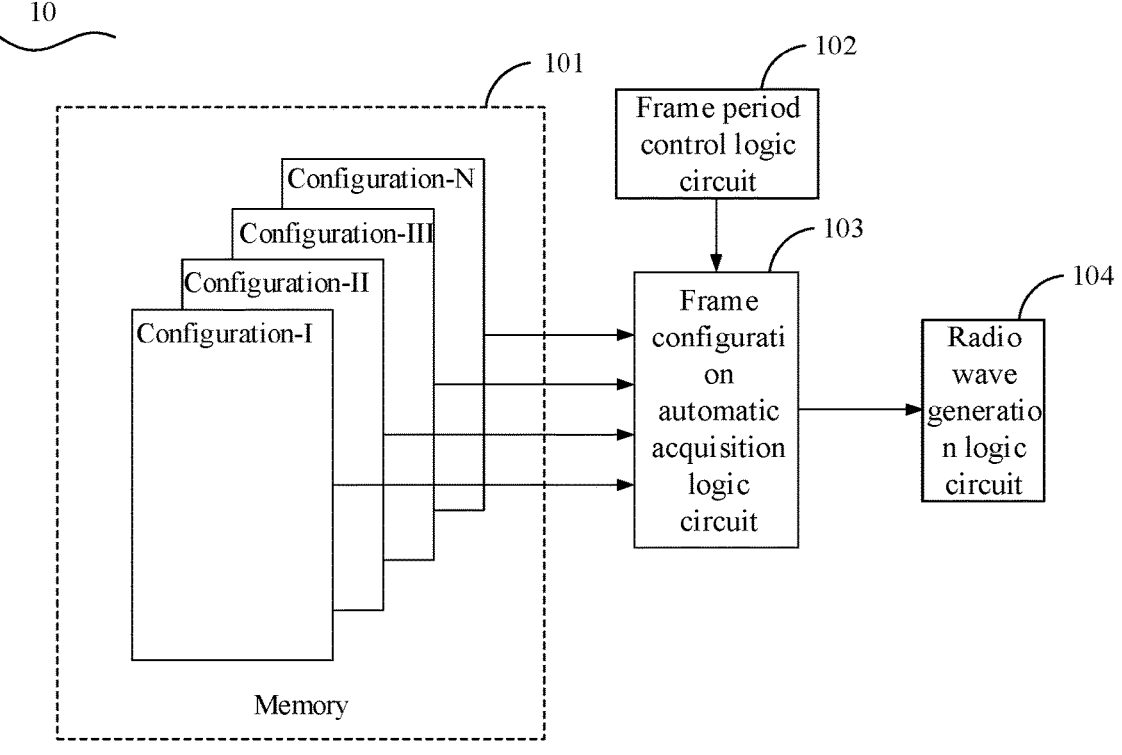

FIG. 6 is a structural schematic diagram of a chip structure in a radio device in accordance with some embodiments of the present disclosure.

Figure 7:
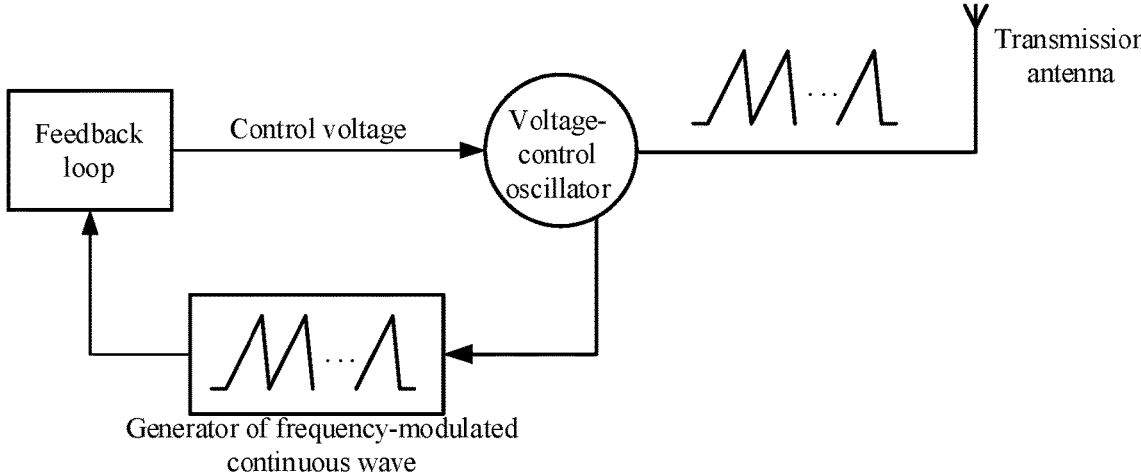

FIG. 7 is a structural schematic diagram of a signal transmission link in accordance with some embodiments of the present disclosure.

DETAILED DESCRIPTION OF THE EMBODIMENTS

In order to facilitate understanding the present disclosure, related drawings will be referred to for more comprehensive description. The drawings show embodiments of the present disclosure. However, the present disclosure may be implemented in various forms but is not limited to the embodiments described herein. On the contrary, the objective of providing these embodiments is to disclose the present disclosure thoroughly.

Unless defined otherwise, all the technical and scientific terms in the present disclosure have the same meanings as generally understood by those skilled in the art. The terms used in the description of the present disclosure are meant to describe particular embodiments rather than to limit the present disclosure.

It is noted that when one element is considered to be "connected" to another element, the element may be directly connected to another element or may be connected to another element via an intermediate element. Besides, "connecting" in the following embodiments shall be understood as "electrically connecting" or "communicatively connecting" if there is transmission of an electrical signal or data between connected objects.

Herein, "a", "an" and "the" in a singular form may include a plural form, unless clearly indicated otherwise. It shall be understood that the terms "include/comprise" and "have" indicate existence of a feature, wholeness, step, operation, component, section or combination thereof, but do not exclude a possibility of existence of or adding one or more other features, wholeness, steps, operations, components, sections or combinations thereof.

As described in the background, when an existing radio device (e.g., a radio communication device, a radio sensor or the like) is configured to transmit continuous frame signals, frame-configuration parameters have to be called externally to a chip to perform configuration again before starting of each frame, as shown in FIG. 1. However, configuration of frame parameters costs some time, which lowers operation efficiency of the radio device.

In the following, a sensor employing frequency-modulated continuous wave (FMCW) is taken as an example for description. The sensor (e.g., a centimeter-wave radar, a millimeter-wave radar or the like) employing FMCW refers to a sensor for continuous wave whose transmission frequency is modulated by particular signals. A sensor for frequency-modulated continuous wave transmits continuous waves having changing transmission frequencies within a sweep period. There is a certain frequency difference between an echo reflected by an object and a transmission signal. By measuring the frequency difference, information of a distance between a target and the sensor may be acquired. In this way, both a distance and a velocity can be measured. Therefore, the sensor is increasingly advantageous in terms of close range measurement. A transmission waveform of the sensor for frequency-modulated continuous wave determines partial performance of the sensor, for example, a range resolution is determined by a bandwidth of a signal of the sensor for frequency-modulated continuous wave. Therefore, in regard to varied application scenarios, waveforms transmitted by the sensor for frequency-modulated continuous wave differ, and configurations to the sensor for frequency-modulated continuous wave differ.

Based on the above reasons, some embodiments of the present disclosure provide a waveform control method for controlling a waveform of a signal transmitted by a radio device. The radio device includes a chip structure having a memory and further includes or has access to an external storage. With reference to FIG. 2, the waveform control method includes the following operations.

In S10, the chip structure calls at least two types of frame-configuration parameters from the external storage, and stores the at least two types of frame-configuration parameters in the memory.

In S20, a frame order is acquired, and corresponding frame-configuration parameters are called from the memory in sequence according to the frame order.

In S30, frame period signals are generated according to the corresponding frame-configuration parameters. The frame period signals include at least two frames of signals.

The above-mentioned frame order refers to an order of a plurality of frame-configuration parameters within a preset duration.

In the waveform control method as described above, before transmitting the frame period signals, the frame-configuration parameters are called in advance and stored in the memory, so that desired frame-configuration parameters can directly be called from the memory subsequently, without need of acquiring externally, thereby saving time for calling the frame-configuration parameters. By acquiring the frame order, a configuration order of a plurality of frame-configuration parameters within a preset duration can be acquired in one time, and the frame period signals can be generated according to the corresponding frame-configuration parameters, without need of performing configuration before generation of each frame of signals, thereby saving time required for generating the frame period signals based on the frame-configuration parameters. In other words, with one configuration, the radio device can call corresponding frame-configuration parameters in sequence according to the frame order. For a piece of radio signals within the preset duration, the frame-configuration parameters corresponding to a plurality of frames can be called through only one configuration. It is not necessary to reconfigure the radio signals at the beginning of each frame in a case where two adjacent frames are different, thereby reducing time desired for configuring the signals transmitted by the radio device and improving operation efficiency of the radio device. Moreover, the radio device can be kept in an operation state during the configuration, thereby preventing the problem that the radio device cannot continuously operate during configuration.

It may be understood that the signals transmitted by the radio device may include but not limited to FMCW signals, sawtooth wave signals and the like.

Embodiments of the present disclosure do not limit a type of the memory in the chip structure. The memory may include but not limited to a register, a cache, a memory management unit (MMU) or any other device having a storing function.

In some embodiments, the memory includes registers. The registers have a high reading and writing speed, and data are transmitted in a fast speed between registers. Therefore, in the waveform control method as described above, registers are arranged, as the memory, in the chip structure. In this way, a speed of reading the frame-configuration parameters can be improved, and time desired for configuring the signals transmitted by the radio device can be further reduced, thereby improving operation efficiency of the radio device.

Embodiments of the present disclosure do not specifically limit a type or a number of the frame-configuration parameters, as long as the frame-configuration parameters are related to configuration of the signals transmitted by the radio device. In an example, the frame-configuration parameters in the present disclosure may include but not limited to a chirp rate, a starting frequency, a central frequency, a waveform duration, a waveform gap or the like.

In the following, the frame order and the frame-configuration parameters are described in further detail with reference to FIG. 3.

With reference to FIG. 3, when a modulation mode for the radio device is triangle wave modulation, by acquiring a frame order, a configuration order of frame type-I, frame type-II and a frame type-III for the frame-configuration parameters of three frames of the signal to be transmitted is acquired in one time. Frame-configuration parameters corresponding to the frame type-I, frame-configuration parameters corresponding to the frame type-II and frame-configuration parameters corresponding to the frame type-III are called in sequence. The signals to be transmitted by the radio device are configured according to the frame-configuration parameters corresponding to the frame type-I, the frame-configuration parameters corresponding to the frame type-II and the frame-configuration parameters corresponding to the frame type-III, so that the radio device sends triangle waveforms obtained by configuration according to the frame-configuration parameters corresponding to the frame type-I, the frame-configuration parameters corresponding to the frame type-II and the frame-configuration parameters corresponding to the frame type-III. The frame-configuration parameters refer to parameters such as frequency, bandwidth, waveform duration or the like of the triangle waveforms.

In some embodiments, the corresponding frame-configuration parameters include a first frame configuration parameter corresponding to a first frame of at least two adjacent frames in the frame period signals and a second frame configuration parameter corresponding to a second frame of the at least two adjacent frames, and the first frame configuration parameter and the second frame configuration parameter are different.

The waveform control method as described above is applicable to generate the frame period signals in which the frame-configuration parameters of at least two adjacent frames are different, and it is not necessary to reconfigure the radio signals at the beginning of each frame. In this way, time desired for configuring the signals to be transmitted by the radio device can be reduced and operation efficiency of the radio device can be improved. Moreover, the radio device can be kept in an operation state during the configuration, thereby preventing the problem that the radio device cannot continuously operate during configuration.

As described above, in the waveform control method provided in the present disclosure, by acquiring the frame order, a configuration order of a plurality of frame-configuration parameters within a preset duration can be acquired in one time. With one configuration, the radio device can call corresponding frame-configuration parameters in sequence according to a preset frame-configuration parameter order in the frame order. Based on the same inventive concept, in order to further improve operation efficiency of the radio device and reduce configuration time, the present disclosure provides some embodiments relating to acquiring a frame order according to a certain period.

In some embodiments, S20 may include periodically and circularly calling the corresponding frame-configuration parameters from the memory in sequence according to the frame order.

In the waveform control method as described above, the corresponding frame-configuration parameters can be circularly called, according to a certain period, in sequence according to a preset frame-configuration parameter order in the frame order by performing one configuration. In this way, time desired for configuring the signals to be transmitted by the radio device can be further reduced and operation efficiency of the radio device can be improved.

In some embodiments, the waveform control method as described above may be used to control numbers of circulation for the frame order. In the following, the process of periodically and circularly calling the corresponding frame-configuration parameters from the memory in sequence is described in further detail with reference to FIG. 4A to FIG. 4B.

In some embodiments, when an acquired frame order is "frame type-I", as shown in FIG. 4A, frame configuration parameters corresponding to frame type-I may be called and repeated by a period of one frame. In some embodiments, when an acquired frame order is "frame type-I, frame type-II", as shown in FIG. 4B, frame configuration parameters corresponding to frame type-I and the frame type-II may be called in sequence and circulated by a period of two frames, and so on and so forth.

In some embodiments, a set of random numbers may be acquired and the frame order may be generated based on the set of random numbers. In the following, the operation of acquiring the set of random numbers and generating the frame order based on the set of random numbers is described in further detail with reference to FIG. 4C.

In some embodiments, as shown in FIG. 4C, before transmitting the frame period signals, the chip structure calls a plurality of frame-configuration parameters corresponding to frame type-I, frame type-II, frame type-III, frame type-IV and frame type-V respectively from the external storage and stores the plurality of frame-configuration parameters in the memory. When the acquired random numbers are 1, 4, 3, 1 . . . 2, 5, a frame order of "frame type-I, frame type-IV, frame type-III, frame type-I, . . . frame type-II and frame type-V" may be generated based on the set of random numbers. Based on the frame order, the frame-configuration parameters corresponding to frame type-I, frame type-IV, frame type-III, frame type-I, . . . frame type-II and frame type-V are called in sequence.

It is noted that in the present disclosure, the category and number of frame types are not limited to the number listed above, but there may be frame types of other categories and numbers which are not specifically described in detail.

In order to improve correlation with an application scenario, so that the radio device is able to transmit signals having increased matching degree with a current application scenario, in some embodiments, as shown in FIG. 5, S20 may further include the following operations.

In S201, application environment parameters are acquired.

In S202, corresponding frame order is acquired according to intervals in which the application environment parameters fall.

In the waveform control method as described above, the current application scenario can be determined according to the intervals in which the application environment parameters fall, and the frame order can be adaptively selected according to the current application scenario. In this way, the radio device can transmit testing signals more applicable to the current application scenario, and accuracy of operation of the radio device can be improved.

In some embodiments, each frame order may be correlated with one interval in which the application environment parameters fall, so that when implementing the waveform control method as described above, a frame order can be called according to one or more correlated intervals in which the application environment parameters fall.

In some embodiment, the current application scenario may be determined according to the intervals in which the application environment parameters fall. Alternatively, an application scenario may be adaptively selected according to an actual condition. Further, a frame order of a next frame more appropriate for testing operation of the radio device may be adaptively called according to echo signals originated from signals currently transmitted, so as to achieve iterative refinement.

In the present disclosure, the types and numbers of the application environment parameters are not specifically defined. The application environment parameters may include but not limited to relative velocity, relative distance, relative angle or the like.

Taking the application environment parameters including relative velocity as an example, a relative velocity of a target object is acquired in real time, an interval in which the relative velocity falls is determined, and a frame order corresponding to the interval in which the relative velocity falls may be called.

It shall be understood that though the operations in the flow charts in FIG. 2 and FIG. 5 are shown in sequence as directed to by the arrows, the operations are not implemented in the order indicated by the arrows. Unless clearly described in the present disclosure, implementation of the operations is not strictly limited to a specific sequence, but the operations may be implemented in other sequences. Moreover, at least some operations in FIG. 2 and FIG. 5 may include a plurality of operations or a plurality of phases that are not necessarily implemented at the same time, but may be implemented at different time points. In addition, the operations or phases are not necessarily implemented in sequence, but may be implemented in turn or alternately with other operations or at least some operations or phases in other operations.

With reference to FIG. 6, the present disclosure further provides a radio device according to some embodiments. The radio device includes a chip structure 10 and an external storage (not shown in FIG. 6), at least two types of frame-configuration parameters are pre-stored in the external storage. Herein, the chip structure 10 may include a memory 101, a frame period control logic circuit 102, a frame configuration automatic acquisition logic circuit 103 and a radio wave generation logic circuit 104.

In some exemplary embodiments, the memory 101 is configured to store the at least two types of frame-configuration parameters called from the external storage before frame period signals are transmitted. The frame period control logic circuit 102 is configured to output a frame order. The frame configuration automatic acquisition logic circuit 103 is connected to the memory 101 and the frame period control logic circuit 102, and is configured to call corresponding frame-configuration parameters from the memory 101 in sequence according to the frame order. The radio wave generation logic circuit 104 is connected to the frame configuration automatic acquisition logic circuit 103 and is configured to generate the frame period signals according to the corresponding frame-configuration parameters. It is noted that the frame period signals include at least two frames of signals.

In the radio device as described above, the memory 101 can store the frame-configuration parameters called in advance before the frame period signals being transmitted, so that desired frame-configuration parameters can be directly called from the memory 101 subsequently, without need of acquiring externally, thereby saving time for calling the frame-configuration parameters. The frame period control logic circuit 102 can acquire and output in one time a configuration order for a plurality of frame-configuration parameters within a preset duration, so that the frame configuration automatic acquisition logic circuit 103 can call corresponding frame-configuration parameters in sequence from the memory 101 based on the configuration order. Then the radio wave generation logic circuit 104 can generate corresponding frame period signals based on the frame-configuration parameters, without need of performing configuration before generation of each of the frame period signals, thereby reducing time desired for generating the frame period signals based on the frame-configuration parameters. In other words, with one configuration, the radio device as described above can call corresponding frame-configuration parameters in sequence according to the frame order. For a piece of radio signals within the preset duration, the frame-configuration parameters corresponding to a plurality of frames can be called through only one configuration. It is not necessary to reconfigure the radio signals at the beginning of each frame in a case where two adjacent frames are different, thereby reducing time desired for configuring the signals to be transmitted and improving operation efficiency. Moreover, the radio device can be kept in an operation state during the configuration, thereby preventing the problem that the radio device cannot continuously operate during configuration.

It should be understood that the radio device as described above may be configured to transmit radio signals including but not limited to FMCW signals.

In some embodiments, the corresponding frame-configuration parameters include a first frame configuration parameter corresponding to a first frame of at least two adjacent frames in the frame period signals and a second frame configuration parameter corresponding to a second frame of the at least two adjacent frames, and the first frame configuration parameter and the second frame configuration parameter are different.

The radio device as described above can generate the frame period signals in which the first frame-configuration parameter corresponding to the first frame of at least two adjacent frames and the second frame configuration parameter corresponding to the second frame are different, and it is not necessary to reconfigure the radio signals at the beginning of each frame. In this way, time desired for configuring the signals to be transmitted can be reduced and operation efficiency can be improved. Moreover, the radio device can be kept in an operation state during the configuration, thereby preventing the problem that the radio device cannot continuously operate during configuration.

In some embodiments, the frame configuration automatic acquisition logic circuit 103 is further configured to periodically and circularly call the corresponding frame-configuration parameters from the memory 101 in sequence according to the frame order.

The radio device as described above can circularly call corresponding frame-configuration parameters in a certain period and in sequence according to a preset frame-configuration parameter order in the frame order with one configuration, thereby further reducing time desired for configuring the signals to be transmitted and improving operation efficiency.

In some embodiments, the frame period control logic circuit 102 is further configured to acquire application environment parameters and to output corresponding frame order according to intervals in which the application environment parameters fall.

The radio device as described above can determine the current application scenario according to the intervals in which the application environment parameters fall, and can adaptively select the frame order according to the current application scenario. In this way, the radio device can transmit testing signals more applicable to the current application scenario, thereby improving accuracy of operation.

It is noted that all or some modules of the radio device may be implemented through hardware. The modules may be embedded as hardware in or independent from a processor in a computer device to facilitate the processor calling and performing operations corresponding to the modules. It is further noted that division to the modules in the present disclosure is exemplary and is only a division in terms of logical functions. The modules may be divided in other ways in implementation.

Based on a similar inventive concept, the present disclosure further provides a radio signal according to some embodiments. The radio signal includes at least one frame period, and a frame period includes a configuration unit and at least two continuous frame units after the configuration unit.

In some exemplary embodiments, the configuration unit is configured to configure frame-configuration parameters for each of the at least two continuous frame units.

In the radio signal as described above, with the configuration unit, the frame-configuration parameters can be configured for the frame units within a preset duration in one time, without need of performing configuration before generation of each frame unit, thereby saving time for configuring the frame units.

The radio signal involved in the present disclosure is described in further detail with reference to FIG. 3.

With reference to FIG. 3, in the radio signal as shown in FIG. 3, the frame unit may include frame-configuration parameters including but not limited to frame type-I, frame type-II, frame type-III and the like. That is, the plurality of frame units within the present duration can be configured by one configuration unit in one time.

In some embodiments, among the frame units of the radio signal, frame-configuration parameters of at least two adjacent frame units differ. That is, each frame unit includes a plurality of signal units, and waveforms of the plurality of signal units are the same in a same frame unit.

In the radio signal as described above, the configuration unit can configure, in one time, frame units among which at least two adjacent frame units have different frame-configuration parameters within the preset duration, without need of performing configuration before generation of the frame units having different frame-configuration parameters, thereby saving time desired to configure the frame units.

It should be understood that the radio signal in the present disclosure may include but not limited to FMCW signals.

With reference to FIG. 7, the present disclosure further provides a signal transmission link according to some embodiments. The signal transmission link includes a feedback loop, a voltage-controlled oscillator and a transmission antenna connected in sequence. The signal transmission link further includes a generator of frequency-modulated continuous wave connected to the voltage-controlled oscillator and the feedback loop respectively. The generator of frequency-modulated continuous wave is configured to control, through the feedback loop, the voltage-controlled oscillator to transmit the radio signal according to any one of the above embodiments via the transmission antenna.

As shown in FIG. 7, a control voltage is generated by the feedback loop and provided to the voltage-controlled oscillator. Under the control of the input control voltage, the FMCW signals are generated by the voltage-controlled oscillator and then sent via the transmission antenna.

The signal transmission link as described above includes the generator of frequency-modulated continuous wave capable of transmitting the radio signals provided in any one of the preceding embodiments. The signal transmission link can achieve the technical effects that can be achieved by the radio signals, which is not described in detail herein.

Moreover, the signal transmission link as described above applies the voltage-controlled oscillator as a controlled component. The voltage-controlled oscillator has advantages such as stable frequency, high control sensitivity, wide frequency modulation range, a linear relationship between a frequency offset and the control voltage, applicability of integration and the like.

The present disclosure does not specifically define a type of the voltage-controlled oscillator. In some exemplary embodiments, the voltage-controlled oscillator may include but not limited to an inductance-capacitance (LC) voltage-controlled oscillator, a resistance-capacitance (RC) voltage-controlled oscillator, a crystal voltage-controlled oscillator or the like.

In some embodiments, the feedback loop, the voltage-controlled oscillator and the generator of frequency-modulated continuous wave may be integrated in a same chip structure.

In some embodiments, the transmission antenna may also be integrated in the chip structure.

In some embodiments, the present disclosure further provides a radio frequency device that may include a carrier and the signal transmission link provided in any one of the preceding embodiments. The signal transmission link may be fixedly disposed on the carrier to transmit and receive radio signals.

The carrier in the present disclosure may include but not limited to a printed circuit board (PCB). The present disclosure does not specifically define a particular form of the carrier.

In some embodiments, the present disclosure further provides a device including a device body and the radio frequency device provided in the preceding embodiments. The radio frequency device may be disposed on the device body, and a signal transmitted by the radio frequency device may be configured for target detection and/or communication.

In some exemplary embodiments, the signal transmitted by the radio frequency device may include but not limited to a FMCW signal.

It is noted that the radio frequency device may further include a signal reception link, a signal processing module and the like. In some embodiments, the radio frequency device may include an antenna-in-package (AiP) millimeter-wave radar chip. The AiP is able to provide excellent system performance. A plurality of antennas can be arranged on the package to achieve multiple types of array arrangement. An interconnection region between the antennas and the chip may be extremely short so that a signal can arrive the antennas by passing a shorter path. Moreover, a module size of the AiP is generally one tenth of that of a traditional module or even smaller. In this way, cost can be reduced and the use can be easier, a user does not have to perform design and development of antennas, and development period and cost of the products can be shortened, thereby reducing time cost before the product coming into the market and the cost.

In some embodiments of the present disclosure, the radio frequency device may further include a millimeter-wave signal transmission and reception chip or a millimeter-wave radar integration chip, system-on-a-chip (SoC). On the basis of the above embodiments, an antenna may be integrated on the PCB, and the millimeter-wave signal transmission and reception chip and the millimeter-wave radar SoC chip may be connected to the antenna to achieve functions such as target detection and/or communication.

In some embodiments, the radio frequency device may be arranged outside the device body. In some embodiments of the present disclosure, the radio frequency device may be arranged within the device body. In some embodiments, the radio frequency device may be arranged partially within the device body and partially outside the device body, which is not specifically defined in the present disclosure, but is determined as appropriate.

It can be understood that the device body in the present disclosure may include parts and products applied to fields such as intelligent residence, traffic, smart home, electronic consumption, surveillance, industrial automation, cabin inspection and hygiene. For example, the device body may be an intelligent traffic and transportation device (e.g., an automobile, a bike, a motorbike, a ship, a metro, a train or the like), a safe and protection device (e.g., a camera), a liquid level/flow rate detection device, an intelligent wearable device (e.g., an intelligent wristband, glasses or the like), an smart home device (e.g., a television, an air-conditioner, an intelligent lamp or the like), a communication device (e.g., a mobile phone, a tablet computer or the like) and so on. The device body may further be a barrier gate, an intelligent traffic light, an intelligent signboard, a traffic camera or various industrial mechanical arms (or robot) and the like. Alternatively, the device body may be various instruments for detecting vital sign parameters and various devices carrying the instruments, for example, an automobile cabin inspection device, an interior personnel surveillance device and an intelligent medical device (or a robot). When the device body is applied to an advanced driving assistance system (ADAS), a radio device (e.g., a millimeter-wave radar) as an onboard sensor may provide the ADAS system with safety functions including but not limited to autonomous emergency braking (AEB), blind spot detection (BSD), lane change alert (LCA, as in a lane change decision aid system (LCDAS)), rear cross traffic alert (RCTA), and automatic parking. It may be understood that the radio device may include the radio device provided in any one of the preceding embodiments. The structure and the operation principle of the radio device have been described in detail in the preceding embodiments and thus are not repeated here. The technical effects achieved by the radio device as described above also can be achieved and are not repeated here.

In some embodiments of the present disclosure, an integrated circuit is provided. The integrated circuit is applied to a radio device including an external storage in which at least two types of frame-configuration parameters are pre-stored. The integrated circuit includes: a memory, a frame period control logic circuit, a frame configuration automatic acquisition logic circuit and a radio wave generation logic circuit.

Herein, the memory is configured to store the at least two types of frame-configuration parameters called from the external storage before frame period signals being transmitted. The frame period control logic circuit is configured to output a frame order. The frame configuration automatic acquisition logic circuit is connected to the memory and the frame period control logic circuit and is configured to call corresponding frame-configuration parameters from the memory in sequence according to the frame order. The radio wave generation logic circuit is connected to the frame configuration automatic acquisition logic circuit and is configured to generate the frame period signals according to the corresponding frame-configuration parameters. The frame-configuration parameters of at least two adjacent frames in the frame period signals are different.

In the integrated circuit as described above, the memory can store the frame-configuration parameters called in advance before the frame period signals being transmitted, so that the desired frame-configuration parameters can be directly called from the memory subsequently, without need of acquiring externally, thereby saving time for calling the frame-configuration parameters. The frame period control logic circuit can acquire and output in one time a configuration order for a plurality of frame-configuration parameters within a preset duration, so that the frame configuration automatic acquisition logic circuit can call corresponding frame-configuration parameters in sequence from the memory based on the configuration order. Then the radio wave generation logic circuit can generate corresponding frame period signals based on the frame-configuration parameters, without need of performing configuration before generation of each of the frame period signals, thereby reducing time desired for generating the frame period signals based on the frame-configuration parameters. In other words, with one configuration, the integrated circuit as described above can call corresponding frame-configuration parameters in sequence according to the frame order. For a piece of radio signals within the preset duration, the frame-configuration parameters corresponding to the plurality of frames can be called through only one configuration. It is not necessary to reconfigure the radio signals at the beginning of each frame in a case where two adjacent frames are different, thereby reducing time desired for configuring the signals to be transmitted and improving operation efficiency. Moreover, the integrated circuit can be kept in an operation state during the configuration, thereby preventing the problem that the integrated circuit cannot continuously operate during configuration.

Those of ordinary skill in the art may understand that all or partial processes in the methods in the embodiments may be achieved by instructing related hardware through a computer program. The computer program may be stored in a non-volatile computer-readable storage media. When the computer program is being executed, the processes in the embodiments of the methods may be included. Herein, any reference to the storage, database or other media used in the embodiments in the present disclosure may include at least one of a non-volatile memory and a volatile memory. The non-volatile memory may include a read-only memory (ROM), a magnetic cassette, a floppy disk, a flash memory, an optical memory or the like. The volatile memory may include a random access memory (RAM) or an external cache. To perform description rather than to put a limitation, the RAM may be of multiple forms such as a static random access memory (SRAM), a dynamic random access memory (DRAM) or the like.

In the description of the present disclosure, reference term "in one embodiment" means that the features, structures, materials or properties described in the embodiment or example are included in at least one embodiment or example in the present disclosure. In the present disclosure, the illustrative description on the term does not necessarily refer to the same embodiment or example.

The technical features in the embodiments may be combined randomly. In order to make the description brief and concise, not all possible combinations of the technical features in the embodiments are described. However, as long as the combinations of the technical features are not contradictory against each other, all of the combinations shall be taken as falling into the scope of the present disclosure.

The embodiments are only some implements of the present disclosure. The description of the embodiments is specific and detailed but shall not be taken as limiting the patent scope of the present disclosure. It shall be indicated that for those of ordinary skill in the art, variations and improvement may be made without departing from the concept of the present disclosure and belong to the protection scope of the present disclosure. Therefore, the protection scope of the present disclosure shall be subject to the appended claims.

What is claimed is:

1. A waveform control method for controlling a waveform of a signal transmitted by a radio device, wherein the radio device comprises a chip structure having a memory and further comprises or has access to an external storage, and the method comprises:

reading frame-configuration parameters from the external storage and storing the frame-configuration parameters in the memory, wherein the frame-configuration parameters are of a plurality of types, and frame-configuration parameters of a respective type correspond to a respective waveform of a signal transmitted in a respective frame;

reading corresponding frame-configuration parameters from the memory in sequence according to a configurable frame-configuration parameter order; and generating frame period signals according to the corresponding frame-configuration parameters;

wherein the frame period signals comprise a plurality of frames of signals, and at least two of the plurality of frames respectively correspond to at least two types of the plurality of types.

2. The waveform control method according to claim 1, wherein the corresponding frame-configuration parameters include a first frame configuration parameter corresponding to a first frame of at least two adjacent frames in the frame period signals and a second frame configuration parameter corresponding to a second frame of the at least two adjacent frames, and wherein the first frame configuration parameter and the second frame configuration parameter are different.

3. The waveform control method according to claim 1, wherein reading the corresponding frame-configuration parameters from the memory in sequence according to the configurable frame-configuration parameter order comprises:

periodically and circularly reading the corresponding frame-configuration parameters from the memory in sequence according to the configurable frame-configuration parameter order.

4. The waveform control method according to claim 1, wherein reading the corresponding frame-configuration parameters from the memory in sequence according to the configurable frame-configuration parameter order comprises:

acquiring application environment parameters; and selecting a corresponding configurable frame-configuration parameter order according to intervals in which the application environment parameters fall.

5. The waveform control method according to claim 1, wherein before reading the corresponding frame-configuration parameters from the memory in sequence according to the configurable frame-configuration parameter order, the waveform control method comprises:

acquiring a set of random numbers; and generating a corresponding configurable frame-configuration parameter order according to the set of random numbers.

6. A radio device, comprising a chip structure and an external storage, wherein frame-configuration parameters are pre-stored in the external storage, and wherein the chip structure comprises:

a memory, configured to store the frame-configuration parameters before frame period signals are transmitted, wherein the frame-configuration parameters are of a plurality of types;

a frame period control logic circuit, configured to output a configurable frame-configuration parameter order;

a frame configuration automatic acquisition logic circuit, connected to the memory and the frame period control logic circuit and configured to read corresponding frame-configuration parameters from the memory in sequence according to the configurable frame-configuration parameter order; and a radio wave generation logic circuit, connected to the frame configuration automatic acquisition logic circuit and configured to generate the frame period signals according to the corresponding frame-configuration parameters;

wherein the frame period signals comprise a plurality of frames of signals, at least two of the plurality of frames respectively corresponding to at least two types of the plurality of types, and wherein frame-configuration parameters of a respective type correspond to a respective waveform of a signal transmitted in a respective frame.

7. The radio device according to claim 6, wherein the corresponding frame-configuration parameters include a first frame configuration parameter corresponding to a first frame of at least two adjacent frames in the frame period signals and a second frame configuration parameter corresponding to a second frame of the at least two adjacent frames, and wherein the first frame configuration parameter and the second frame configuration parameter are different.

8. The radio device according to claim 6, wherein the frame configuration automatic acquisition logic circuit is further configured to periodically and circularly read the corresponding frame-configuration parameters from the memory in sequence according to the configurable frame-configuration parameter order.

9. The radio device according to claim 6, wherein the frame period control logic circuit is further configured to acquire application environment parameters and to output corresponding configurable frame-configuration parameter order according to intervals in which the application environment parameters fall.

10. The radio device according to claim 6, wherein the frame period control logic circuit is further configured to acquire a set of random numbers and generate corresponding configurable frame-configuration parameter order according to the set of random numbers.

11. An integrated circuit, operable in a radio device comprising an external storage in which frame-configuration parameters are pre-stored, wherein the integrated circuit comprising:

a memory, configured to store the frame-configuration parameters before frame period signals being transmitted, wherein the frame-configuration parameters are of a plurality of types;

a frame period control logic circuit, configured to output a configurable frame-configuration parameter order;

a frame configuration automatic acquisition logic circuit, connected to the memory and the frame period control logic circuit and configured to read corresponding frame-configuration parameters from the memory in sequence according to the configurable frame-configuration parameter order; and a radio wave generation logic circuit, connected to the frame configuration automatic acquisition logic circuit, and configured to generate the frame period signals according to the corresponding frame-configuration parameters;

wherein the frame period signals comprise a plurality of frames of signals, at least two of the plurality of frames respectively corresponding to at least two types of the plurality of types, and wherein frame-configuration parameters of a respective type correspond to a respective waveform of a signal transmitted in a respective frame.

12. The integrated circuit according to claim 11, wherein the corresponding frame-configuration parameters include a first frame configuration parameter corresponding to a first frame of at least two adjacent frames in the frame period signals and a second frame configuration parameter corresponding to a second frame of the at least two adjacent frames, and wherein the first frame configuration parameter and the second frame configuration parameter are different.

13. The integrated circuit according to claim 11, wherein the frame configuration automatic acquisition logic circuit is further configured to periodically and circularly read the corresponding frame-configuration parameters from the memory in sequence according to the configurable frame-configuration parameter order.

14. The integrated circuit according to claim 11, wherein the frame period control logic circuit is further configured to acquire application environment parameters and to output corresponding configurable frame-configuration parameter order according to intervals in which the application environment parameters fall.

15. The integrated circuit according to claim 11, wherein the frame period control logic circuit is further configured to acquire a set of random numbers and generate corresponding configurable frame-configuration parameter order according to the set of random numbers.

\* \* \* \* \*